United States Patent

[11] 3,542,323

| [72] | Inventor | James W. Arnold |
| | | Riverside, California |
| [21] | Appl. No. | 794,033 |
| [22] | Filed | Jan. 27, 1969 |
| [45] | Patented | Nov. 24, 1970 |
| [73] | Assignee | A/S Tool Design & Manufacturing |
| | | Riverside, California |

[54] HOLDER FOR DIAL INDICATORS
4 Claims, 3 Drawing Figs.

[52] U.S. Cl. .................................................. 248/205,
33/172; 279/42
[51] Int. Cl. ...................................................... B23b 29/00
[50] Field of Search ........................................... 248/205,
309; 33/172, 172(D); 279/42; 287/54(A),
103(D)

[56]                References Cited
UNITED STATES PATENTS

| 2,721,390 | 10/1955 | Pasturczak | 33/172 |
| 3,129,918 | 4/1964 | Bradley | 33/172 |
| 3,265,343 | 8/1966 | Sandford | 248/205 |

FOREIGN PATENTS

| 420,085 | 9/1943 | Italy | 279/42 |

Primary Examiner—Roy D. Frazier
Assistant Examiner—J. Franklin Foss
Attorney—Lyon & Lyon ABSTRACT: A holder for dial indicators which includes a shaft, one end of which has a set of mandrels to be received in collets of different diameters and the other end is provided with a longitudinal bore and a transverse bore, and a collar screw-threaded on the shaft to clamp a rod in the longitudinal bore or the transverse bore for the purpose of supporting a dial indicator in essentially coaxial relation to said shaft or in laterally offset relation thereto.

Patented Nov. 24, 1970
3,542,323
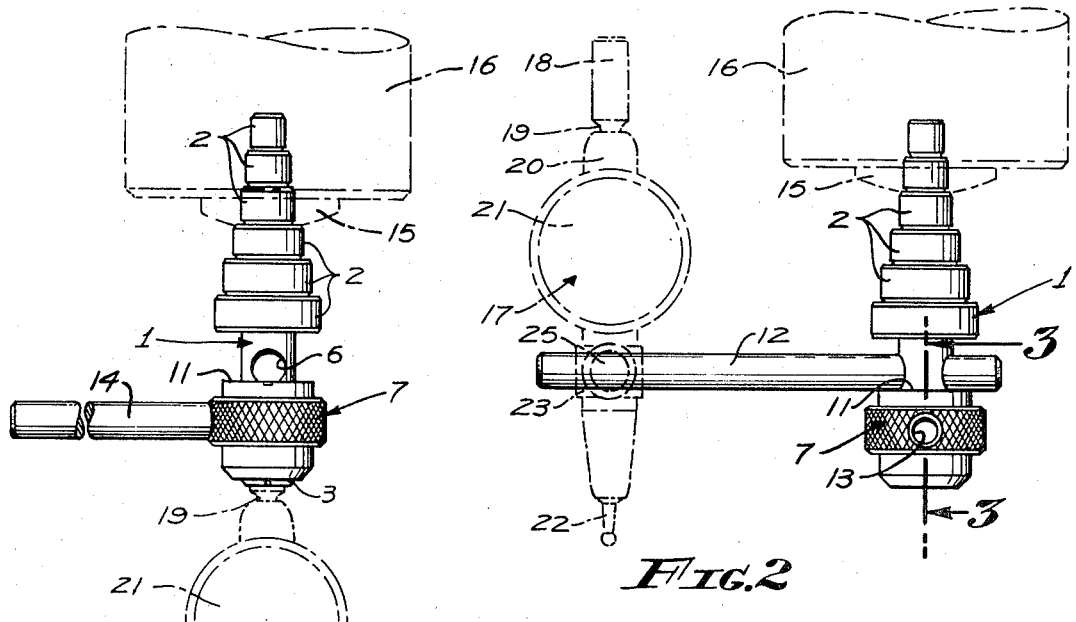
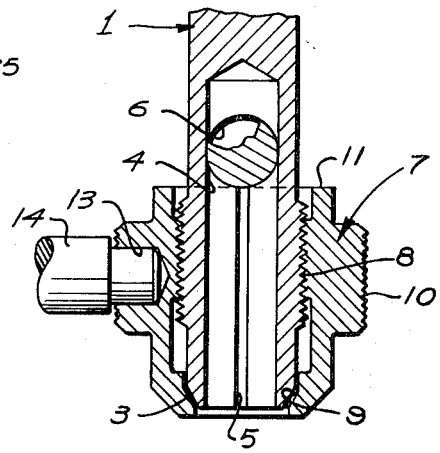
FIG. 1
FIG. 2
FIG. 3
INVENTOR.
JAMES W. ARNOLD
BY
Lyon & Lyon
ATTORNEYS

HOLDER FOR DIAL INDICATORS

BACKGROUND OF THE INVENTION

It is conventional practice to mount a dial indicator in the spindle of a mill and sometimes in the headstock of a lathe to measure concentricity of a workpiece with respect to the axis of rotation of the mill or lathe, or to measure the location of a surface, either vertical or horizontal, with respect to the plane of movement of the workpiece in relation to the axis of rotation. The diameters which may be measured are limited by the angular displacement permitted by a ball and socket joint which connects the dial indicator with a chucking shank.

Often the dial indicator and the cutting tool, such as an end mill, to be substituted therefore, are held in a collet chuck. If the dial indicator shank and tool shank are of different diameters, this requires changing the collet chuck.

SUMMARY OF THE INVENTION

The objects of this invention include:

First, to provide a holder for a dial indicator comprising a shank to be received in a collet chuck and a screw-threaded collar arranged to secure a dial indicator shank coaxially or to secure a radially disposed shaft for supporting the dial indicator in radially displaced relation to the axis of the collet chuck.

Second, to provide a holder for a dial indicator wherein the end of the shank received in the collet chuck is provided with chucking mandrels of different size to minimize the need to change the collet after using the dial indicator in order to chuck an end mill or other cutting tool.

DESCRIPTION OF THE FIGURES

FIG. 1 is a side view of the holder for dial indicators, indicating by broken lines a spindle in which the holder is secured, and also indicating by broken lines a dial indicator mounted coaxially with the holder;

FIG. 2 is a similar side view of the holder for dial indicators, also indicating by broken lines, a spindle in which the holder is mounted, as well as indicating by broken lines, a dial indicator mounted in radially offset relation to the holder; and FIG. 3 is an enlarged fragmentary sectional view, taken through 3-3 of FIG. 2.

SPECIFICATION

The holder for dial indicators includes a shank 1, which is provided with a stepped set of coaxial cylindrical portions forming chucking mandrels 2. The shank extends from the chucking mandrels and terminates in a tapered tip 3. This extremity is provided with a longitudinal coaxial socket 4, having a pair or more longitudinal slots 5. Adjacent the inner end of the socket 4, the shank is provided with a transverse bore 6.

The holder also includes a collar 7 which is adapted to be received on the shank 1. The shank 1 and the collar are provided with screw-threads which form a screw-threaded connection 8 so that the collar 7 may be adjusted axially on the shank 1. At the outer end of the collar 7, with respect to the shank, the collar is provided with an internally tapered portion 9, which mates with the tapered tip 3. Intermediate its ends, the collar is provided with an enlarged knurled portion 10. The axially inner end of the collar 7 forms an integral locking ring 11, positioned to overlap the transverse bore 6 so as to clamp a mounting shaft 12 extending radially therethrough.

The knurled portion 10 is provided with a socket 13 which receives a removable turning bar 14.

Any selected chucking mandrel 2 is adapted to fit within a collet 15 of corresponding diameter, forming part of a collet chuck mounted in a spindle 16, which may be the spindle of a milling machine intended to receive an end mill or other milling tool. The spindle may, however, be part of the headstock of a lathe.

A typical dial indicator 17 for which the holder is adapted includes a mounting shank or rod 18, joined by a ball and socket connection 19 to the body 20 of the indicator, on which is mounted the indicator dial 21. The body continues from the indicator dial and is provided at its extremity with a feeler tip 22. Also mounted on the body 20 is a bracket 23, having a rod receiving collar 24, provided with a setscrew 25.

Operation of the holder for dial indicators is as follows:

If it is desired to mount the dial indicator 17 in an essentially coaxial position, the mounting shank or rod 18 is inserted in the socket 4 and secured therein by interengagement of the tapered tip 3 and the internally tapered portion 9, so that the dial indicator is positioned as shown in FIG. 1. If it is desired to mount the dial indicator in radially offset relation with the holder, a rod 26 of appropriate diameter is inserted in the transverse bore 6 and the collar is screwed onto the shank until the locking ring 11 engages the rod 26, as shown in FIGS. 2 and 3. It will be noted that when the ring 11 has secured the rod 26, there is clearance between the tapered tip 3 and the tapered portion 9, as indicated in FIG. 3. The dial indicator is appropriately secured to the rod 26 by means of its bracket 23, collar 24 and setscrew 25, as shown in FIG. 2.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A holder for securing a dial indicator with respect to a spindle mounted collet chuck, comprising:
   a. A shank including a first end dimensioned for reception in a collet chuck, a transverse rod receiving bore intermediate its ends, and a second end having a slotted longitudinal socket therein, and externally tapered extremity and external screwthreads; and
   b. A collar screw-threaded on the second end of said shank and including an internally tapered end engageable with said tapered extremity to cause said shank to grip said dial indicator in essentially coaxial relation to said shank, a clamping means at its end opposite from said tapered extremity for cooperation with said transverse bore to clamp said rod in radially disposed relation to said shank for mounting said dial indicator in radially displaced relation to said shank.

2. A holder, as defined in claim 1, wherein the first end of said shank is provided with a set of chucking mandrels which increase in diameter toward said midportion of said shank.

3. A holder for mounting a tool supporting rod in coaxial or radially offset relation to the axis of said holder, said holder comprising:
   a. a shank including a mountable portion and an extended portion, and having a slotted socket extending inwardly from its extended portion, a tapered tip at the extremity of said extended portion, and a transverse bore intermediate its ends; and
   b. a collar axially movable on said shank and including a first means cooperating with said tapered tip to clamp a tool supporting rod in said socket and a second means cooperating with said transverse bore to clamp a radially extending rod therein.

4. A holder, as defined in claim 3, wherein said mountable portion includes a set of chucking mandrels of graduated diameters.